United States Patent
Avakian

(10) Patent No.: US 8,680,192 B2
(45) Date of Patent: Mar. 25, 2014

(54) CRYSTALLIZED THERMOPLASTIC POLYHYDROXYALKANOATE COMPOUNDS

(75) Inventor: Roger W. Avakian, Solon, OH (US)

(73) Assignee: PolyOne Corporation, Avon Lake, OH (US)

( * ) Notice: Subject to any disclaimer, the term of this patent is extended or adjusted under 35 U.S.C. 154(b) by 316 days.

(21) Appl. No.: 13/056,481

(22) PCT Filed: Jul. 28, 2009

(86) PCT No.: PCT/US2009/051991
§ 371 (c)(1),
(2), (4) Date: Jan. 28, 2011

(87) PCT Pub. No.: WO2010/014630
PCT Pub. Date: Feb. 4, 2010

(65) Prior Publication Data
US 2011/0193007 A1    Aug. 11, 2011

Related U.S. Application Data

(60) Provisional application No. 61/084,589, filed on Jul. 29, 2008.

(51) Int. Cl.
*C08K 3/26* (2006.01)

(52) U.S. Cl.
USPC ............................. 524/425; 524/413; 252/62

(58) Field of Classification Search
USPC ........................................................ 524/425
See application file for complete search history.

(56) References Cited

U.S. PATENT DOCUMENTS

| 4,544,601 A * | 10/1985 | Yamaguchi et al. ......... 428/330 |
| 7,098,292 B2 | 8/2006 | Zhao et al. |
| 7,582,456 B2 | 9/2009 | Chen |
| 7,968,657 B2 | 6/2011 | Avakian |
| 2003/0181555 A1 | 9/2003 | Figuly |
| 2004/0039092 A1 | 2/2004 | Asrar et al. |
| 2004/0225269 A1 | 11/2004 | Zhao et al. |

FOREIGN PATENT DOCUMENTS

| EP | 291024 A2 * | 11/1988 |
| EP | 0736563 | 10/1996 |
| WO | WO 2008049099 A1 * | 4/2008 |

OTHER PUBLICATIONS

Specialty Minerals (EMforce Bio additive), Sep. 2007.*
Kotnis et al (Processing and Mechanical Properties of Biodegradable Poly(hydroxybutyrate-co-valerate)-Starch Compositions, Journal of Environmental Polymer Degradation, vol. 3, No. 2, 1995, 97-105).*

* cited by examiner

*Primary Examiner* — Ling Choi
*Assistant Examiner* — Wenwen Cai
(74) *Attorney, Agent, or Firm* — John H. Hornickel

(57) ABSTRACT

A thermoplastic compound is disclosed, comprising polyhydroxyalkanoate and an effective amount of a nucleating agent of surface treated precipitated calcium carbonate. Optionally the compound also includes additional polymers and functional additives to modify physical properties of the compound. Molded or extruded plastic articles can be made from the compound. The compound has a crystallization temperature of more than about 108° C.

12 Claims, No Drawings

CRYSTALLIZED THERMOPLASTIC POLYHYDROXYALKANOATE COMPOUNDS

CLAIM OF PRIORITY

This application claims priority from U.S. Provisional Patent Application Ser. No. 61/084,589 and filed on Jul. 29, 2008, which is incorporated by reference.

FIELD OF THE INVENTION

This invention concerns the use of new nucleating agents to engineer crystallized polyhydroxyalkanoate compounds.

BACKGROUND OF THE INVENTION

People benefit from plastic articles. From their invention in the mid-20$^{th}$ Century until the present, thermoplastic polymers have become the composition of many consumer products. Such products are relatively lightweight, sturdy, and corrosion resistant.

Thermoplastic polymers during the past half-century have used resins produced from petrochemical feedstocks. As this Century progresses, there will be an increasing need to produce thermoplastic polymers from biomass feedstocks, whether because of geopolitical considerations, environmental considerations, or supply considerations. One of the thermoplastic polymers produced from bio-derived sources are polyhydroxyalkanoates.

According to European Patent Publication 1 705 250, polyhydroxyalkanoates (PHAs) are biological polyesters accumulated in cells by special microorganisms under special growth conditions and have the following general formula:

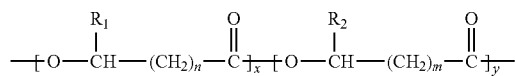

in which, n and m are integers from 1 to 4; $R_1$ and $R_2$ are straight chain or branched chain $C_{1-12}$ alkyl which are substituted or non-substituted; X and Y are not 0 simultaneously, and determine the content of the components in copolymer. The average molecular weight of PHAs is generally 1-4 million Da.

The physical property of PHAs is similar to that of polypropylene. But because its biodegradability, biocompatibility, piezoelectricity and optical activity are characteristics not possessed by common petrochemical resins, it has wide application prospect in industry, agriculture, medicine, sanitation, food, electronics, etc.

Unfortunately, PHAs have crystallinity problems. The crystallinity of PHA increases over time, causing thermoplastic compounds made from that polymer resin to become more brittle over time of storage or use. To counter that, nucleating agents, such as boron nitride, have been used to stabilize the crystallinity creep of the PHA by causing it to crystallize to its maximum prior to commencement of storage or use. In that manner, the crystallinity of PHA can be accounted for in the engineering of physical properties of the thermoplastic compound.

SUMMARY OF THE INVENTION

Unfortunately, nucleating agents such as boron nitride are not helpful beyond their nucleating properties because their cost is excessive relative to their performance.

Therefore, a better nucleating agent is needed for PHAs that is five times less expensive than boron nitride as of the date of this application.

The present invention solves that problem of crystallinity creep by mixing with PHA by modifying PHA with a surface treated precipitated calcium carbonate which unexpectedly causes nucleation as well as boron nitride for far less expense.

Thus, one aspect of the present invention is a thermoplastic polyhydroxyalkanoate compound, comprising polyhydroxyalkanoate mixed with an effective amount of surface treated precipitated calcium carbonate to crystallize the polyhydroxyalkanoate at a temperature of more than about 108° C.

Another aspect of the present invention is a molded article made from the thermoplastic polyhydroxyalkanoate compound.

Another aspect of the present invention is an extruded article made from the thermoplastic polyhydroxyalkanoate compound.

EMBODIMENTS OF THE INVENTION

Polyhydroxyalkanoates

According to U.S. Pat. No. 6,071,998, several types of PHAs are known.

It is useful to broadly divide the PHAs into two groups according to the length of their side chains and according to their pathways for biosynthesis. Those with short side chains, such as polyhydroxybutyrate (PHB), a homopolymer of R-3-hydroxybutyric acid units, are crystalline thermoplastics. These polymers have been known for about seventy years (Lemoigne & Roukhelman 1925).

PHAs with long side chains are more elastomeric and a relatively recent discovery (deSmet, et al., J. Bacteriol., 154: 870-78 (1983)). Before this designation, however, PHAs of microbial origin containing both R-3-hydroxybutyric acid units and longer side chain units from $C_5$ to $C_{16}$ were identified (Wallen & Rowheder, Environ. Sci. Technol., 8:576-79 (1974)).

A number of bacteria which produce copolymers of D-3-hydroxybutyric acid and one or more long side chain hydroxyacid units containing from five to sixteen carbon atoms have been identified more recently (Steinbuchel & Wiese, Appl. Microbiol. Biotechnol., 37:691-97 (1992); Valentin et al., Appl. Microbiol. Biotechnol., 36:507-14 (1992); Valentin et al., Appl. Microbiol. Biotechnol., 40:710-16 (1994); Abe et al., Int. J. Biol Macromol., 16:115-19 (1994); Lee et al, Appl. Microbiol. Biotechnol., 42:901-09 (1995); Kato et al., Appl. Microbiol. Biotechnol., 45:363-70 (1996); Valentin et al., Appl. Microbiol. Biotechnol., 46:261-67 (1996); U.S. Pat. No. 4,876,331 to Doi).

Useful examples of specific two-component copolymers include PHB-co-3-hydroxyhexanoate (Brandl et al., Int. J. Biol. Macromol., 11:49-55 (1989); Amos & McInerey, Arch. Microbiol., 155:103-06 (1991); U.S. Pat. No. 5,292,860 to Shiotani et al.).

Chemical synthetic methods have also been applied to prepare racemic PHB copolymers of this type for applications testing (WO 95/20614, WO 95/20615, and WO 96/20621).

Suitable molecular weights of the polymers are between about 10,000 and 4 million Daltons. Preferable molecular weights are between about 50,000 and 1.5 million Daltons. The PHAs preferably contain one or more units of the following formula:

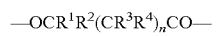

wherein n is 0 or an integer; and wherein $R^1$, $R^2$, $R^3$, and $R^4$ are independently selected from saturated and unsaturated hydrocarbon radicals, halo- and hydroxy-substituted radicals, hydroxy radicals, halogen radicals, nitrogen-substituted radicals, oxygen-substituted radicals, and hydrogen atoms.

Suitable monomeric units include hydroxybutyrate, hydroxyvalerate, hydroxyhexanoate, hydroxyheptanoate, hydroxyoctanoate, hydroxynonanoate, hydroxydecanoate, hydroxyundecanoate, and hydroxydodecanoate units. PHAs including monomers and polymers and derivatives of 3-hydroxyacids, 4-hydroxyacids and 5-hydroxyacids can be used. Representative PHAs are described in Steinbuchel & Valentin, FEMS Microbiol. Lett., 128:219-28 (1995).

A variety of PHAs, having a wide range of polymer physical properties, can be produced, depending on the hydroxy-acid monomer composition used (Steinbuchel & Valentin, FEMS Microbiol. Lett., 128:219-28 (1995)). The range of properties include, for example, melting temperatures between about 40° C. and 180° C., glass transition temperatures between about −35° C. to 5° C., degrees of crystallinity between about 0% and 80%, and elongation to break between about 5 and 500%. The rate of crystallization can be controlled.

Polyhydroxybutyrate, for example, has characteristics similar to those of polypropylene, while polyhydroxyoctanoates (a copolymer of D-3-hydroxyoctanoate and D-3-hydroxyhexanoate) behave more as elastomers, and PHAs with longer side chains have characteristics similar to waxes. The range of PHA polymers available with melting temperatures ranging from 40 to 180° C. provides additional flexibility in shape formation.

PHAs can exist in at least two distinct physical forms, as amorphous granules or as crystalline solids. The tendency of the PHAs to crystallize in terms of both final degree of crystallinity and rates of crystallization also varies with composition. PHA polymers offering rapid crystallization can be used for high green strength. These would include, for example polyhydroxybutyrate (PHB) and polyhydroxybutyrate-co-valerate (PHBV), with the latter copolymer exhibiting the unique feature of isodimorphism. Where higher malleability is desired, polyhydroxyoctanoates (PHOs) and other longer pendant group types could be used. This polymer class has a lower glass transition temperature, around −35° C. as compared to 5° C. for the PHB homopolymer, allowing them to be formulated as self lubricating. This in turn reduces the need for other additives to obtain suitable flow characteristics for the mixture fed to the shaping system.

PHAs are thermally decomposable, a major advantage over thermoplastic polymers made from petrochemical feedstocks.

Suitable commercial PHA copolymers are selected from the group consisting of polyhydroxybutyrate-co-hydroxyvalerate, polyhydroxybutyrate-co-4-hydroxybutrate, polyhydroxybutyrate-co-3-hydroxyhexanoate, polyhydroxybutyrate-co-3-hydroxyheptanoate, and polyhydroxybutyrate-co-3-hydroxyoctanoate.

PHAs are further described in the following patents, which are incorporated by reference herein: 7,094,840; 7,081,357; 7,026,526; 6,913,911; 6,878,758; 6,867,248; 6,867,247; 6,838,493; 6,828,357; 6,780,911; 6,709,848; 6,689,589; 6,623,749; 6,620,869; 6,610,764; 6,593,116; 6,586,658; 6,576,450; 6,548,569; 6,323,276; 6,323,010; 6,316,262; 6,245,537; 6,228,934; 6,214,920; 6,207,217; 6,083,729; and 5,480,794. All of these patents are issued to Metabolix, which is one of the commercial producers of PHAs. Another commercial producer of PHAs is Tianan Biological Material of China.

Surface Treated Precipitated Calcium Carbonate Serving as Nucleating Agent

Precipitated calcium carbonate has a CAS No. of 471-34-1 and is well known to those skilled in the art of polymer chemistry. It is most often used as a filler or as a reinforcing agent.

This invention uses surface treated precipitated calcium carbonate in which the surface treatment contributes to the usefulness of this material with biopolymers such as PHAs.

It has been found, unexpectedly, that a commercial product marketed as a "functional additive for biopolymer reinforcement" actually functions as a nucleating agent. EMforce® Bio additive sold by Mineral Technologies Inc. (dba Specialty Minerals) of Bethlehem, Pa., USA is advertised as a "specially engineered, high aspect ratio, calcium based synthetic mineral product designed to provide a unique balance of excellent impact toughness and high flexural modulus (stiffness) for biopolymers." The product "provides a simple, cost effective method for greatly improving the impact resistance of biopolymers while maintaining stiffness and compostability." One of its key benefits is to "Change Polymer Failure Mode from Brittle to 100% Ductile State." The product has an aspect ratio of about 5.42 and a specific gravity of about 2.7 according to the product literature.

A proprietary substance is identified in the Material Safety Data Sheet as being present in amount from 1 to 5 weight percent in addition to calcium carbonate. It is believed that this proprietary substance is the surface treatment, particularly that which makes it suitable for compostability, as advertised.

Quite importantly, the Product Data Sheet for EMforce® Bio additive includes a plot of weight percent of the additive in polylactic acid (PLA) relative to room temperature impact energy in Joules. The plot shows no effective performance from 0 to 10 weight percent of Emforce® Bio in PLA, with the energy being a straight line at 5 Joules. However, at 15 weight percent, the energy increases to about 12 Joules, and by 20 weight percent, the energy has exceeded 50 Joules. Between 25 and 30 weight percent, the energy begins a decline from about 55 to 50 Joules and decreases by 40 weight percent to about 20 Joules. It is believed that one skilled in the art of polymer compounding would assess this plot to teach effective use of EMforce® Bio additive as a reinforcement in a weight percent of the compound of between about 20 and 30 weight percent and certainly a wasted effort at less than 10 weight percent.

Unexpectedly, it has been found that an effective amount of surface treated precipitated calcium carbonate should be no more than about 6 weight percent of the total PHA compound in order to be useful as a nucleating agent for PHAs. One can add more, as much as 8 or 10 weight percent, without departing from the purpose of the invention, but one would only be wasting the extra amount. Desirably, the amount of this nucleating agent is less than about 4 weight, and preferably the amount should be about 2 weight percent to the total PHA compound.

Optional Additives

The compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Of these optional additives, two are preferable. Impact modifiers such as olefinic or styrenic rubbers can be added to improve impact, and nucleating agents such as boron nitride can be added to assist the pace of crystallization of the compound during manufacture.

Optional Other Polymers

The compound of the present invention can include conventional polymers mixed into the compound to adjust morphology, rheology, or other properties of the thermoplastic matrix of the compound. These optional polymers can be added in an amount that is sufficient to obtain a desired processing or performance property for the compound. The amount should not be wasteful of the additive nor detrimental to the processing or performance of the compound.

Non-limiting examples of optional polymers include those made from petrochemicals and those made from bio-derived resins. Of the many choices possible, polycarbonate (PC), linear-low-density-polyethylene (LLDPE), (meth)acrylates such as methyl methacrylate (PMMA) and ethylene ethyl acrylate (EEA), and polylactic acid (PLA) all can adjust physical properties of the PHA in a desirable manner.

Table 1 shows acceptable, desirable, and preferable weight percentages of ingredients in the compounds of the present invention.

TABLE 1

Weight Percent of Ingredients

| Ingredient | Acceptable | Desirable | Preferable |
|---|---|---|---|
| PHA | 10-90 | 20-80 | 30-70 |
| Nucleating | 0.1-6 | 0.5-4 | 1.5-2.5 |
| Optional Additive | 0-30 | 0-20 | 0-20 |
| Optional Polymer | 0-60 | 0-40 | 0-20 |

Processing

The preparation of compounds of the present invention is uncomplicated. The compound of the present can be made in batch or continuous operations.

Mixing in a continuous process typically occurs in an extruder that is elevated to a temperature that is sufficient to melt the polymer matrix with addition either at the head of the extruder or downstream in the extruder of the solid ingredient optional additives. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is also elevated to a temperature that is sufficient to melt the polymer matrix to permit addition of the solid ingredient optional additives. The mixing speeds range from 60 to 1000 rpm and temperature of mixing can be ambient. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

Usefulness of the Invention

Thermoplastic PHA compounds of the present invention, with nucleation by the surface treated precipitated calcium carbonate resist crystallinity creep at a much lower expense than using boron nitride for such purpose.

PHAs of the present invention can therefore become replacement polymers for any and all manner of thermoplastic compounds used to make extruded or molded plastic articles. The crystallinity stability of compounds of the present invention makes this usefulness possible.

Property modifications of PHA-based thermoplastic compounds can be found using additives to modify thermal conductivity, electrical conductivity, specific gravity, and sound dampening. With these additions, one can make quite sophisticated engineered thermoplastic compounds.

Non-limiting examples of thermal conductivity additives include pitch carbon, graphite, diamond, metal nitrides such as boron nitride and aluminum nitride, nanotubes of carbon and boron nitride, titanium diboride, cobalt, zinc, molybdenum, iridium, silicon, rhodium, magnesium, tungsten, beryllium, aluminum, gold, copper, silver, and combinations thereof.

Non-limiting examples of electrical conductivity additives include carbon black, silver, copper, stainless steel powder or fibers, graphite, zinc, aluminum, carbon nanotubes, manganese, bismuth, samarium, titanium, zirconium, lead, antimony, vanadium, chromium, tin, palladium, platinum, iron, nickel, zinc, cobalt, molybdenum, tungsten, iridium, indium, rhodium, magnesium, beryllium, aluminum, gold, silver, magnetite, bronze, brass, and combinations thereof.

Non-limiting examples of sound dampening additives include tungsten, barium sulfate, zirconium sulfate, calcium sulfate, lead, tungsten, gold, platinum, iridium, osmium, rhenium, tantalum, hafnium, palladium, rhodium, borite, magnetite, hematite, zirconia, ceramic beads, chromite, and combinations thereof.

Non-limiting examples of ionizing-radiation-opacity additives include tungsten, lead, zirconium, graphite, silicon, indium, aluminum, iridium, boron, cadmium, europium, samarium, and combinations thereof.

Non-limiting examples of ionizing-radiation-opacity additives include tungsten, lead, zirconium, graphite, silicon, indium, aluminum, iridium, boron, cadmium, europium, samarium, and combinations thereof.

The amount of these various additives to be included in compounds depends on the extent of modification desired, depending on the change in scope of physical or chemical property desired. It is possible to have such ingredients be present from about 0.1 weight percent to about 80 weight percent.

With these additives, the following engineered thermoplastic articles can be made.

Articles that can benefit from enhanced thermal conductivity include heat sinks such as for computer chip mounts, fuel cell radiators, aircraft leading edges, etc.

Articles that can benefit from enhanced electrical conductivity include bipolar plates for fuel cells, computer enclosures, electrodes, etc.

Articles that can benefit from enhanced sound dampening include automobile interiors, building interiors, etc.

Articles that can benefit from ionizing radiation opacity and/or atomic particle moderation include medical instruments, radioactive containers, radiation dosimeters, detection equipment, etc.

More generally, PHA-based thermoplastic compounds of the present invention can be used in plastic articles in the following industries:

Appliance: Refrigerators, freezers, washers, dryers, toasters, blenders, vacuum cleaners, coffee makers, and mixers;

Building and Construction: Fences, decks and rails, floors, floor covering, pipes and fittings, siding, trim, windows, doors, molding, and wall coverings;

Consumer: Power hand tools, rakes, shovels, lawn mowers, shoes, boots, golf clubs, fishing poles, and watercraft;

Electrical/Electronic: Printers, computers, business equipment, LCD projectors, mobile phones, connectors, chip trays, circuit breakers, and plugs;

Healthcare: Wheelchairs, beds, testing equipment, analyzers, labware, ostomy, IV sets, wound care, drug delivery, inhalers, and packaging;

Industrial: Containers, bottles, drums, material handling, gears, bearings, gaskets and seals, valves, wind turbines, and safety equipment;

Packaging: Food and beverage, cosmetic, detergents and cleaners, personal care, pharmaceutical and wellness;

Transportation: Automotive aftermarket parts, bumpers, window seals, instrument panels, consoles, under hood electrical, engine covers; and Wire and Cable: Cars and trucks, airplanes, aerospace, construction, military, telecommunication, utility power, alternative energy, and electronics.

Other embodiments and advantages of the invention are found in the following examples.

EXAMPLES

Table 2 shows the ingredients of Comparative Examples A-D and Examples 1-3, expressed in weight percent. Table 3 shows the processing conditions using a 16 mm Prism extruder.

It should be noted that even though Comparative Example A only contained PHBV, it was subjected to the same heat history and mechanical action undergone by Comparative Examples B-D and Examples 1-3.

Samples of each of Comparative Examples A-D and Examples were then submitted for characterization by Differential Scanning calorimetry (DSC) using a TA Instruments model DSC 2920. The samples were exposed to a heat-cool-heat cycle in each analysis. The first heating scan typically contained thermal events reflecting thermal/processing history. The controlled cooling provided an established thermal history and allowed determinations of the transitions based on material properties in the second heating scan. The temperature range of each segment was from −60° C. to 190° C. at heating/cooling rates of 10° C./minute. A nitrogen gas purge of 50 ml/minute was used. The quantitative results were determined from the data recorded in each heating segment.

From the data assembled into the form of thermal curves, the crystallization temperature during the cooling scan (Tc) was reported in Table 4.

TABLE 2

Formulations

| | Example Number | | | | | | |
|---|---|---|---|---|---|---|---|
| | A | B | 1 | 2 | 3 | C | D |
| PHBV (Tianan Biologic Material Co., Ningbo, China) | 100 | 99 | 98 | 96 | 94 | 92 | 90 |
| PolarTherm 131 boron nitride (Advanced Ceramics Corporation, Cleveland, Ohio USA) | | 1 | | | | | |
| EMForce ® BIO surface treated precipitated calcium carbonate (Specialty Minerals) | | | 2 | 4 | 6 | 8 | 10 |
| Total | 100 | 100 | 100 | 100 | 100 | 100 | 100 |

TABLE 3

Extruder Conditions

| | A | B | 1 | 2 | 3 | C | D |
|---|---|---|---|---|---|---|---|
| Zone 1 (° C.) | 150 | 150 | 150 | 150 | 150 | 150 | 150 |
| Zone 2 (° C.) | 150 | 150 | 150 | 150 | 150 | 150 | 150 |
| Zone 3 (° C.) | 150 | 150 | 150 | 150 | 150 | 150 | 150 |
| Zone 4 (° C.) | 140 | 140 | 140 | 140 | 140 | 140 | 140 |
| Zone 5 (° C.) | 140 | 140 | 140 | 140 | 140 | 140 | 140 |
| Zone 6 (° C.) | 140 | 140 | 140 | 140 | 140 | 140 | 140 |
| Zone 7 (° C.) | 130 | 130 | 130 | 130 | 130 | 130 | 130 |
| Zone 8 (° C.) | 130 | 130 | 130 | 130 | 130 | 130 | 130 |
| Zone 9 (° C.) | 130 | 130 | 130 | 130 | 130 | 130 | 130 |
| Die (° C.) | 130 | 130 | 130 | 130 | 130 | 130 | 130 |
| RPM | 200 | 200 | 200 | 200 | 200 | 200 | 200 |
| % Torque | 66-69 | 67-72 | 69-75 | 72-77 | 72-79 | 75-79 | 75-79 |
| Die Pressure | 23 | 20 | 18 | 20 | 20 | 20 | 25 |
| Feeder Rate | 30 | 30 | 30 | 30 | 30 | 30 | 30 |
| Vacuum | 4.5 | 4.75 | 5 | 5 | 5 | 5 | 5 |

TABLE 4

DSC Results

| | A | B | 1 | 2 | 3 | C | D |
|---|---|---|---|---|---|---|---|
| Tc (° C.) | 85.4 | 116.5 | 111.2 | 108.9 | 108.5* | 109.5 | 108.1 |

*A second peak was observed at 118.2° C.

Use of surface treated precipitated calcium carbonate at 2 wt. % (Example 1—111° C.) was almost as good as use of boron nitride at 1 wt. % (Comparative Example B—116° C.). As the weight percent of Examples 2, 3, C, and D doubled, tripled, quadrupled, and quintupled, respectively, the Tc essentially leveled off at between 108-109° C., making it more cost effective to add less than about 6 weight percent, desirably less than about 4 weight percent, and preferably about 2 weight percent to achieve the desired nucleating effect.

The invention is not limited to the above embodiments. The claims follow.

What is claimed is:
1. A thermoplastic composition, comprising:
   (a) polyhydroxyalkanoate,
   (b) an effective amount of surface treated precipitated calcium carbonate to crystallize the polyhydroxyalkanoate at a temperature of higher than about 108° C., and wherein the precipitated calcium carbonate is represented by CAS No. 471-34-1 and has an aspect ratio of about 5.42 and a specific gravity of about 2.7, wherein the effective amount is not more than about 6 weight percent of the composition, and (c) an effective amount of a property-modifying additive selected from the group consisting of a thermal conductivity additive, an electrical conductivity additive, a sound dampening additive, an ionizing-radiation-opacity additive, an atomic-particle-moderating additive, and combinations thereof, wherein the thermal conductivity additive selected from the group consisting of pitch carbon, graphite, diamond, metal nitrides, nanotubes of carbon, titanium diboride, cobalt, zinc, molybdenum, iridium, silicon, rhodium, magnesium, tungsten, berylium, aluminum, gold, copper, silver, and combinations thereof, wherein the electrical conductivity additive selected from the group consisting of carbon black, silver, copper, stainless steel powder or fibers, graphite, zinc, aluminum, carbon nanotubes, manganese, bismuth, samarium, titanium, zirconium, lead, antimony, vanadium, chromium, tin, palladium, platinum, iron, nickel, zinc, cobalt, molybdenum, tungsten, iridium, indium, rhodium, magnesium, berylium, aluminum, gold, silver, magnetite, bronze, brass, and combinations thereof, wherein the sound dampening additive selected from the group consisting of tungsten, barium sulfate, zirconium sulfate, calcium sulfate, lead, tungsten, gold, platinum, iridium, osmium, rhenium, tantalum, hafnium, palladium, rhodium, borite, magnetite, hematite, zirconia, ceramic beads, chromite, and combinations thereof, wherein the ionizing-radiation-opacity additive selected from the group consisting of tungsten, lead, zirconium, graphite, silicon, indium, aluminum, iridium, boron, cadmium, europium, samarium, and combinations thereof, wherein the atomic-particle-moderating additive selected from the group consisting of tungsten, lead, zirconium, graphite, silicon, indium, aluminum, iridium, boron, cadmium, europium, samarium, and combinations thereof.

2. The thermoplastic composition according to claim 1, wherein the polyhydroxyalkanoate contains one or more monomeric units of the following formula:

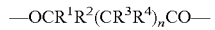

wherein n is 0 or an integer; and wherein R1, R2, R3, and R4 are independently selected from saturated and unsaturated hydrocarbon radicals, halo- and hydroxy-substituted radicals, hydroxy radicals, halogen radicals, nitrogen-substituted radicals, oxygen-substituted radicals, and hydrogen atoms.

3. The thermoplastic composition of claim 2, wherein the monomeric units comprise hydroxybutyrate, hydroxyvalerate, hydroxyhexanoate, hydroxyheptanoate, hydroxyoctanoate, hydroxynonanoate, hydroxydecanoate, hydroxyundecanoate, or hydroxydodecanoate.

4. The thermoplastic composition of claim 1, wherein the polyhydroxyalkanoate comprises polyhydroxybutyrate-co-valerate.

5. The thermoplastic composition of claim 1, wherein the polyhydroxyalkanoate is selected from the group consisting of polyhydroxybutyrate-co-hydroxyvalerate, polyhydroxybutyrate-co-4-hydroxybutrate, polyhydroxybutyrate-co-3-hydroxyhexanoate, polyhydroxybutyrate-co-3- hydroxyheptanoate, and polyhydroxybutyrate-co-3-hydroxyoctanoate.

6. The thermoplastic composition of claim 1, wherein the effective amount is less that about 4 weight percent of the composition.

7. The thermoplastic composition of claim 1, further comprising an additional polymer selected from the group consisting of polycarbonate, polylactic acid, linear low density polyethylene, ethylene ethyl acrylate copolymer, and combinations thereof.

8. The thermoplastic composition of claim 1, further comprising adhesion promoters; biocides; anti-fogging agents; anti-static agents; bonding, blowing and foaming agents; dispersants; fillers and extenders; fire and flame retardants and smoke suppresants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; or combinations of them.

9. An article made from the thermoplastic composition of claim 1.

10. The article of claim 9, wherein the article is in the form of computer chip mounts, fuel cell radiators, aircraft leading edges, bipolar plates for fuel cells, computer enclosures, electrodes, automobile interiors, building interiors, medical instruments, radioactive containers, radiation dosimeters, or detection equipment.

11. The article of claim 9, wherein the composition further comprises an additional polymer selected from the group consisting of polycarbonate, polylactic acid, linear low density polyethylene, ethylene ethyl acrylate copolymer, and combinations thereof.

12. The article of claim 9, wherein the composition further comprises adhesion promoters; biocides; anti-fogging agents; anti-static agents; bonding, blowing and foaming agents; dispersants; fillers and extenders; fire and flame retardants and smoke suppresants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; or combinations of them.

* * * * *